(12) United States Patent
Himes et al.

(10) Patent No.: US 12,284,984 B2
(45) Date of Patent: Apr. 29, 2025

(54) GROOMING TOOL FOR ANIMAL AND METHODS

(71) Applicant: Spectrum Brands, Inc., Middleton, WI (US)

(72) Inventors: William D. Himes, Radford, VA (US); Kathryn E. Yee, Middleton, WI (US); Jewel M. Cary, Middleton, WI (US); William P. Robertson, Middleton, WI (US); Jessica E. Hubbard, Middleton, WI (US); Chris Stoll, Middleton, WI (US)

(73) Assignee: Spectrum Brands, Inc., Middleton, WI (US)

( * ) Notice: Subject to any disclaimer, the term of this patent is extended or adjusted under 35 U.S.C. 154(b) by 1 day.

(21) Appl. No.: 18/258,134

(22) PCT Filed: Dec. 2, 2021

(86) PCT No.: PCT/US2021/061627
§ 371 (c)(1),
(2) Date: Jun. 16, 2023

(87) PCT Pub. No.: WO2022/132454
PCT Pub. Date: Jun. 23, 2022

(65) Prior Publication Data
US 2024/0107981 A1 Apr. 4, 2024

Related U.S. Application Data

(60) Provisional application No. 63/127,572, filed on Dec. 18, 2020.

(51) Int. Cl.
*A01K 13/00* (2006.01)

(52) U.S. Cl.
CPC .................... *A01K 13/002* (2013.01)

(58) Field of Classification Search
CPC ........ A01K 13/002; A46B 5/002; A46B 5/02; A46B 5/00; A46B 2200/104; A46B 7/023;
(Continued)

(56) References Cited

U.S. PATENT DOCUMENTS 793,784 A * 7/1905 Hackett ................ A01K 13/002
261/119.1
1,432,054 A 10/1922 Cuff
(Continued)

FOREIGN PATENT DOCUMENTS

AU 2016371895 A1 7/2018
CA 2503178 A1 4/2006
(Continued)

OTHER PUBLICATIONS

International Search Report and Written Opinion for PCT/US2021/061627 (Mar. 24, 2022).

*Primary Examiner* — Joshua J Michener
*Assistant Examiner* — Nicole Paige Maccrate
(74) *Attorney, Agent, or Firm* — Merchant & Gould P.C.

(57) ABSTRACT

A grooming tool for use on an animal includes a base arrangement sized for grasping by a human hand. A first section of grooming members is secured to the base arrangement and includes flexible members. A second section of grooming members is spaced from the first section and includes flexible members. A third section of rigid grooming members are positioned between the first section and second section of grooming members. The tool can include a grip assembly having a pivotable grip member.

23 Claims, 8 Drawing Sheets

(58) Field of Classification Search
CPC ......... A46B 5/005; A46B 5/0058; A46B 7/00;
A46B 2200/1093; A46B 2200/10; A46B
5/021; A46B 9/065
USPC .......................... 15/22.1, 172, 185; D30/158
See application file for complete search history.

(56) References Cited

U.S. PATENT DOCUMENTS

| | | | |
|---|---|---|---|
| 2,811,794 | A | 11/1957 | Angelis |
| 2,946,075 | A * | 7/1960 | Slaughter, Jr. ............ A46B 5/00 15/184 |
| 3,055,033 | A | 9/1962 | Peilet et al. |
| 3,935,981 | A | 2/1976 | Akopov et al. |
| 4,225,997 | A | 10/1980 | Thomas et al. |
| 4,987,633 | A | 1/1991 | Heneveld |
| 5,185,902 | A | 2/1993 | Fong |
| 5,336,012 | A | 8/1994 | Newville |
| 5,443,321 | A * | 8/1995 | Dolan ................ A46B 11/0013 132/156 |
| 5,485,807 | A | 1/1996 | Bertwell et al. |
| 5,661,868 | A | 9/1997 | Panagakos et al. |
| 6,213,055 | B1 | 4/2001 | Willinger et al. |
| 6,230,659 | B1 | 5/2001 | Karlsson |
| 6,378,462 | B1 * | 4/2002 | Gaves ................. A01K 13/004 119/621 |
| 6,450,127 | B2 | 9/2002 | Willinger et al. |
| 6,474,119 | B1 | 11/2002 | Halvorson et al. |
| D466,696 | S | 12/2002 | Van Dyk |
| D467,434 | S | 12/2002 | Choi et al. |
| 6,510,816 | B2 | 1/2003 | Ehrmann |
| 6,543,388 | B2 | 4/2003 | Willinger et al. |
| 6,718,913 | B1 | 4/2004 | Stupar |
| D490,194 | S | 5/2004 | Plante et al. |
| 6,851,431 | B2 | 2/2005 | Mayeri |
| D508,299 | S | 8/2005 | Dunn et al. |
| 7,246,573 | B2 | 7/2007 | Dunn et al. |
| 7,322,364 | B2 | 1/2008 | Hurwitz |
| 7,337,784 | B2 | 3/2008 | Hurwitz |
| 7,600,287 | B1 | 10/2009 | Moore et al. |
| 7,694,687 | B2 | 4/2010 | Hurwitz |
| 7,926,492 | B2 | 4/2011 | Hurwitz |
| 8,006,705 | B2 | 8/2011 | Hurwitz |
| 8,042,216 | B2 | 10/2011 | Jochim et al. |
| 8,082,887 | B2 | 12/2011 | Fernandez |
| 8,291,732 | B2 | 10/2012 | Ramsauer et al. |
| 8,528,501 | B2 | 9/2013 | Prochaska |
| 8,555,819 | B1 | 10/2013 | McFarland |
| 8,560,031 | B2 | 10/2013 | Barnett et al. |
| 8,595,887 | B2 | 12/2013 | Hiltmann |
| 9,578,943 | B2 | 2/2017 | Guy-Rabi et al. |
| 9,591,906 | B2 | 3/2017 | Guy-Rabi et al. |
| 9,787,348 | B2 | 10/2017 | Srour |
| 9,877,562 | B2 | 1/2018 | Guy-Rabi et al. |
| D817,007 | S | 5/2018 | Guy-Rabi et al. |
| 9,958,107 | B1 | 5/2018 | Hobbs et al. |
| 9,970,589 | B2 | 5/2018 | Hobbs et al. |
| D822,391 | S | 7/2018 | Murrihy et al. |
| 10,034,455 | B2 | 7/2018 | Murrihy et al. |
| 10,054,259 | B2 | 8/2018 | Hobbs et al. |
| 10,060,573 | B2 | 8/2018 | Hobbs et al. |
| 10,082,163 | B1 | 9/2018 | Srout |
| 10,172,324 | B2 | 1/2019 | Lou |
| 10,215,329 | B2 | 2/2019 | Hobbs et al. |
| 10,244,856 | B1 * | 4/2019 | Horsky ................. A45D 24/14 |
| 10,390,605 | B1 * | 8/2019 | Schechter ............ A01K 13/002 |
| 10,463,116 | B2 | 11/2019 | Barnett et al. |
| 10,655,775 | B2 | 5/2020 | Hobbs et al. |
| 2001/0011528 | A1 | 8/2001 | Willinger et al. |
| 2002/0040686 | A1 | 4/2002 | Willinger et al. |
| 2002/0078902 | A1 | 6/2002 | Ehrmann |
| 2005/0150465 | A1 | 7/2005 | Dunn et al. |
| 2006/0000423 | A1 * | 1/2006 | Morosin ............ A01K 13/002 119/600 |
| 2006/0102094 | A1 | 5/2006 | Dunn et al. |
| 2007/0017538 | A1 | 1/2007 | Hurwitz |
| 2007/0017539 | A1 | 1/2007 | Hurwitz |
| 2007/0144451 | A1 | 6/2007 | Hurwitz |
| 2007/0261643 | A1 | 11/2007 | Hurwitz |
| 2008/0051846 | A1 | 2/2008 | Brodnick et al. |
| 2008/0051851 | A1 | 2/2008 | Lin |
| 2008/0202544 | A1 | 8/2008 | Hurwitz |
| 2009/0101076 | A1 * | 4/2009 | Khubani ............ A01K 13/002 119/611 |
| 2009/0314304 | A1 | 12/2009 | Jochim et al. |
| 2010/0011525 | A1 | 1/2010 | Habrle |
| 2010/0307426 | A1 * | 12/2010 | Bertsch ............ A01K 13/002 119/633 |
| 2011/0088186 | A1 * | 4/2011 | Hilmann ............ A01K 13/002 15/106 |
| 2011/0138563 | A1 | 6/2011 | Phgura |
| 2011/0297100 | A1 | 12/2011 | Dennis |
| 2012/0111282 | A1 | 5/2012 | Dennis |
| 2013/0042816 | A1 | 2/2013 | Prochaska |
| 2015/0000609 | A1 * | 1/2015 | Frye ................. A01K 13/001 119/625 |
| 2015/0101139 | A1 | 4/2015 | Guy-Rabi et al. |
| 2015/0107528 | A1 * | 4/2015 | Moeller ................ A46B 9/023 119/625 |
| 2015/0272308 | A1 | 10/2015 | Harrington et al. |
| 2016/0100663 | A1 | 4/2016 | Guy-Rabi et al. |
| 2016/0262518 | A1 | 9/2016 | Guy-Rabi et al. |
| 2017/0119124 | A1 | 5/2017 | Guy-Rabi et al. |
| 2017/0172105 | A1 | 6/2017 | Murrihy et al. |
| 2017/0172106 | A1 | 6/2017 | Koursiotis |
| 2017/0195000 | A1 | 7/2017 | Srour |
| 2017/0265431 | A1 | 9/2017 | Urso et al. |
| 2017/0367923 | A1 | 12/2017 | Bergbacka |
| 2018/0051846 | A1 | 2/2018 | Hobbs et al. |
| 2018/0051851 | A1 | 2/2018 | Hobbs et al. |
| 2018/0064066 | A1 | 3/2018 | Lou |
| 2018/0066791 | A1 | 3/2018 | Hobbs et al. |
| 2018/0119873 | A1 | 5/2018 | Hobbs et al. |
| 2018/0132452 | A1 * | 5/2018 | Dionne ................. A46B 9/023 |
| 2018/0187823 | A1 | 7/2018 | Hobbs et al. |
| 2018/0195660 | A9 | 7/2018 | Hobbs et al. |
| 2018/0206626 | A1 * | 7/2018 | Binnington .......... A46B 5/0029 |
| 2018/0274571 | A1 | 9/2018 | Spour |
| 2018/0332820 | A1 | 11/2018 | Murrihy et al. |
| 2018/0368363 | A1 * | 12/2018 | Johnson ............ A01K 13/002 |
| 2019/0208871 | A1 | 7/2019 | Barnett et al. |

FOREIGN PATENT DOCUMENTS

| | | |
|---|---|---|
| CA | 2726681 A1 | 12/2009 |
| CA | 3008001 A1 | 6/2017 |
| CA | 2964942 A1 | 9/2018 |
| CN | 102186435 A | 9/2011 |
| CN | 204616707 U | 9/2015 |
| CN | 107205358 A | 9/2017 |
| CN | 108430214 A | 8/2018 |
| CN | 108632422 A | 10/2018 |
| EP | 1860975 A1 | 12/2007 |
| EP | 2293666 A1 | 3/2011 |
| EP | 2355746 A2 | 8/2011 |
| EP | 2849605 A1 | 3/2015 |
| EP | 3250025 A1 | 12/2017 |
| EP | 3284338 A1 | 2/2018 |
| EP | 3379811 A1 | 9/2018 |
| EP | 3389370 A1 | 10/2018 |
| ES | 2713510 T3 | 5/2019 |
| FI | 126033 B | 5/2016 |
| FI | 20155065 A | 5/2016 |
| GB | 2474220 B | 12/2011 |
| GB | 2510146 B | 11/2017 |
| JP | 3061057 U | 9/1999 |
| JP | 3125635 U | 9/2006 |
| JP | 2011-045706 A | 3/2011 |
| JP | 2011-524168 A | 9/2011 |
| JP | 2018-537985 A | 12/2018 |
| WO | 95/15679 A1 | 6/1995 |
| WO | 00/42879 A2 | 7/2000 |
| WO | 2006/079817 A1 | 8/2006 |
| WO | 2007/013982 A2 | 2/2007 |

(56) References Cited

FOREIGN PATENT DOCUMENTS

| | | |
|---|---|---|
| WO | 2009/149569 A1 | 12/2009 |
| WO | 2010/007358 A2 | 1/2010 |
| WO | 2013/171570 A1 | 11/2013 |
| WO | 2016/120521 A1 | 8/2016 |
| WO | 2016/165560 A1 | 10/2016 |
| WO | 2017/106260 A1 | 6/2017 |
| WO | 2017/160406 A1 | 9/2017 |
| WO | 2019/135788 A1 | 7/2019 |
| WO | 2020/027940 A1 | 2/2020 |

* cited by examiner

GROOMING TOOL FOR ANIMAL AND METHODS

CROSS-REFERENCE TO RELATED APPLICATION

This application is a National Stage Application of PCT International Patent Application No. PCT/US2021/061627, filed Dec. 2, 2021, which claims the benefit of priority to U.S. Provisional Patent Application No. 63/127,572, filed Dec. 18, 2020 which applications are incorporated herein by reference. To the extent appropriate, a claim of priority is made to each of the above disclosed applications.

TECHNICAL FIELD

This disclosure is for a grooming tool for use on an animal. In particular, this disclosure describes a grooming tool having multiple zones, including zones for grooming sensitive areas of the animal. This disclosure also relates to methods of making and using the grooming tool.

BACKGROUND

Many households include animals as pets. For animals with fur coats, it is helpful to groom the animal to help keep the fur coat healthy and to prevent shedding of the fur throughout the owners house.

Some animals are resistant to being groomed because the grooming tool is uncomfortable, ticklish, or painful, particularly in sensitive areas.

What is needed is a grooming tool that can be used on animals in sensitive areas, as well as unsensitive areas.

SUMMARY

A grooming tool for sensitive areas of an animal is provided. The grooming tool comprising: a base arrangement sized for grasping by a human hand; a first section of grooming members; the grooming members in the first section being flexible members secured to the base arrangement; and a second section of grooming members spaced from the first section; the grooming members in the second section being flexible members and secured to the base arrangement.

In many examples, a third section of grooming members positioned between the first section and second section; the third section of grooming members being rigid members.

Many embodiments can further include a grip assembly projecting from the base arrangement in a direction opposite of a direction that the first section and second section of grooming members extend from the base arrangement.

In one or more embodiments, the grooming members in the first section comprise a plurality of flexible blades; and the grooming members of the second section comprise a plurality of flexible tines.

The grooming members in the third section comprise a plurality of rigid tines, in many examples.

In example embodiments, the base arrangement comprises a bottom piece having the third section of grooming members integral therewith; an overmold piece having the first section and second section of grooming members integral therewith; the overmold piece being secured to the bottom piece; and a top piece secured to the bottom piece and overmold piece and including an opening to accommodate a portion of the grip assembly.

The overmold piece can include a segment, between the first section and second section of grooming members, that allow penetration of the third section of grooming members in the bottom piece.

For example embodiments, the bottom piece includes a container, on an opposite side of the third section, holding at least a portion of the grip assembly.

In many examples, the grip assembly includes: a grip handle and a fastener arrangement; the grip handle being secured to the base arrangement by the fastener arrangement and being constructed and arranged to pivot relative to the base arrangement.

The grip handle is T-shaped, in one or more examples.

In some examples, the T-shape includes a pair of flexible wings to accommodate varying finger sizes.

The grip handle is preferably rotatable within a plane perpendicular to a longitudinal axis of the grip handle.

In one or more embodiments, the base arrangement is curved having a concave portion and convex portion; the first section, second section, and third section extending from the concave portion.

The grip assembly extends from the convex portion, in many examples.

In many examples, the first section is adjacent a first end of the base arrangement; the second section is adjacent a second end of the base arrangement; and the third section is in a middle area of the base arrangement.

The third section of grooming members may project from the base arrangement longer than the first section of grooming members and second section of grooming members, in one or more examples.

In another aspect, a grooming tool is provided. The grooming tool includes: a base arrangement sized for grasping by a human hand; the base arrangement having an upper face and a lower face; grooming members projecting from the lower face; and a grip assembly projecting from the upper face; the grip assembly including a grip handle that is both: (i) pivotable relative to the base arrangement; and (ii) rotatable relative to the base arrangement.

In one or more embodiments, the grip assembly includes a fastener arrangement securing the grip handle to the base arrangement.

The grip handle can be T-shaped, in some examples.

The T-shape may include a pair of flexible wings to accommodate varying finger sizes.

In some examples, the grooming members include: a first section of grooming members; the grooming members in the first section being flexible members secured to the base arrangement; a second section of grooming members spaced from the first section; the grooming members in the second section being flexible members and secured to the base arrangement; and a third section of grooming members positioned between the first section and second section; the third section of grooming members being rigid members.

Example embodiments can include the grooming members in the first section comprise a plurality of flexible blades; the grooming members of the second section comprise a plurality of flexible tines; and the grooming members in the third section comprise a plurality of rigid tines.

In another aspect, a method of grooming an animal is provided. The method comprising: grasping a base arrangement; using flexible members in a first section secured to the base arrangement to remove dirt from the animal; and using flexible members in a second section, spaced from the first section, secured to the base arrangement to remove dirt and loose hair from the animal.

Many methods further include using rigid members in a third section, positioned between the first section and second section, to groom and remove loose hair from the animal.

In example methods, the step of grasping a base arrangement including grasping a grip assembly projecting from the base arrangement.

In many example methods, the step of grasping a grip assembly includes pivoting a grip handle from a position adjacent the base arrangement to a position extending from the base arrangement.

The method can include using a base arrangement that is curved having a concave portion and convex portion; the first section, second section, and third section extending from the concave portion.

The method can include using the third section of grooming members projecting from the base arrangement longer than the first section of grooming members and second section of grooming members.

The step of grasping a grip assembly can include rotating a grip handle within a plane perpendicular to a longitudinal axis of the grip handle A variety of examples of desirable product features or methods are set forth in the description that follows, and in part, will be apparent from the description, or may be learned by practicing various aspects of this disclosure. The aspects of this disclosure may relate to individual features, as well as combinations of features. It is to be understood that booth the foregoing general description, and the following detailed description, are explanatory only, and are not restrictive of the claimed inventions.

DETAILED DESCRIPTION

An example embodiment of a grooming tool for use on an animal such as a dog or cat kept as a pet is shown at 10. The tool 10 can be used on animals with fur, and is especially helpful for grooming sensitive areas of an animal. Sensitive areas can include any areas on the animal in which normal grooming tool tines would cause discomfort, including either pain or ticklishness.

The tool 10 includes a base arrangement 12. The base arrangement 12 is sized for grasping by a human hand. For example the base arrangement 12 can have a width of less than 4 inches, such as 2-3 inches, and a length of less than 7 inches, such as 4-6 inches.

Figure 2:
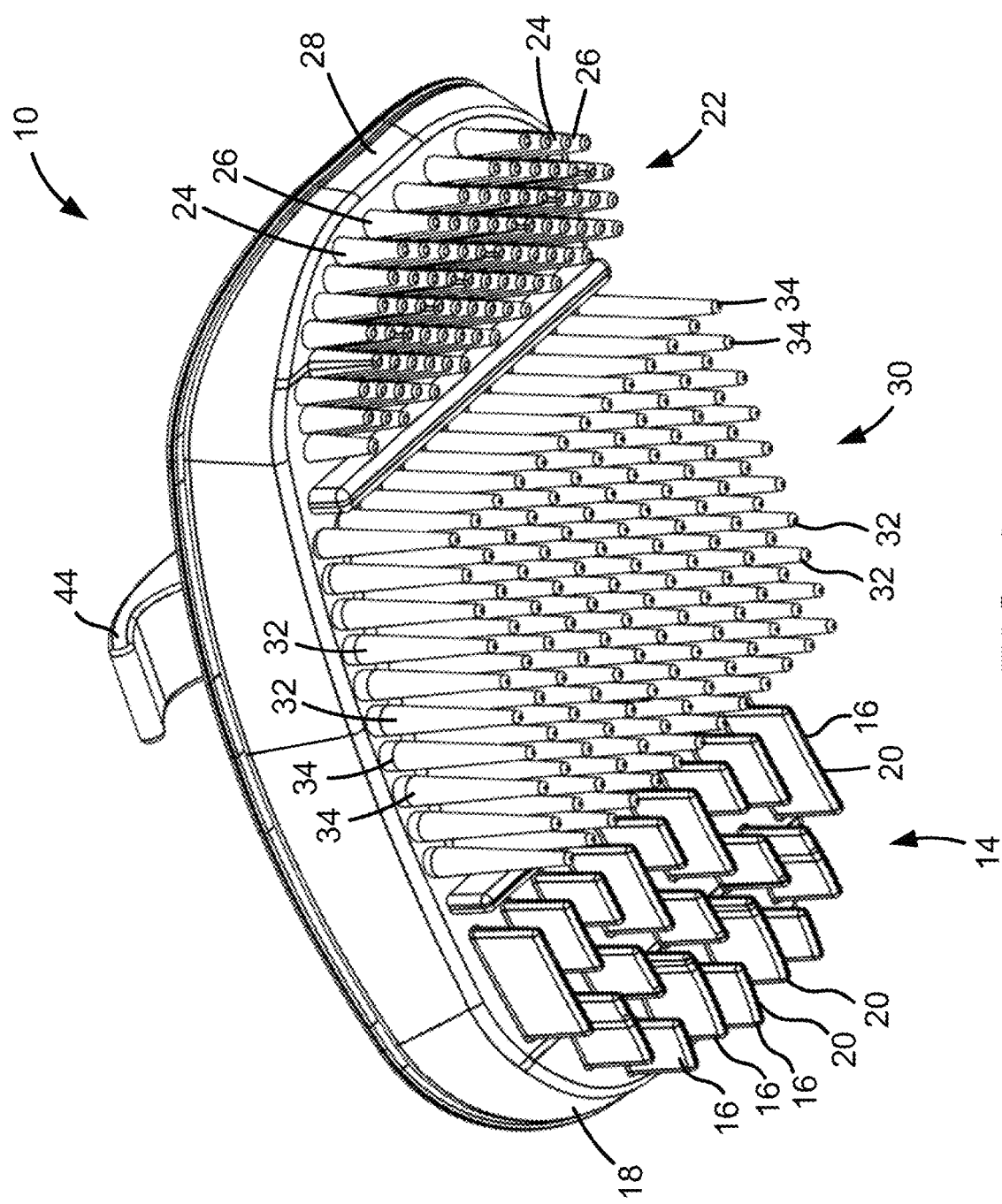
FIG. 2 is a bottom perspective view of the grooming tool of FIG. 1.

The tool 10 includes a first zone or section 14 of grooming members 16. The grooming members 16 in the first section 14 are secured to the base arrangement 12 and are flexible. By flexible, it is meant that the grooming member 16 are easily bent without breaking. The grooming members 16 are pliant, and when used on an animal will bend or flex away from the direction of grooming motion. That is, if the tool 10 is being moved across an animal from right to left, the free ends of the grooming members 16 will bend toward the right. In FIG. 2, it can be seen how the grooming members 16 in the first section 14 are located adjacent a first end 18 of the base arrangement 12.

The first section 14 can be made of a variety of materials and shaped. In this example, the grooming members 16 in the first section 14 are made for removal of dirt and debris from fur, in sensitive areas. In the example shown, the grooming members 16 include a plurality of flexible blades 20. The blades 20 can vary in number and arrangement, and in the example shown in FIG. 2, the blades 20 are arranged in a staggered form, approximating about three rows having between 3-12 blades 20 per row. Many variations are possible.

The tool 10 further includes a second section 22 of grooming members 24. The second section 22 of grooming members 24 is spaced apparat from the first section 14. By spaced apart, it is meant that the second section 22 is not immediately adjacent the first section 14, but spaced sufficiently apart from it that other structure is in between the first section 14 and second section 22.

The grooming members 24 in the second section 22 includes flexible grooming members 24 secured to the base arrangement 12. The term flexible, in this case, has the same definition as flexible for the grooming members 16 in the first section 14.

The grooming members 24 in the second section 22 are constructed and arranged for use in sensitive areas of the animal being groomed. While many variations are possible, in this example embodiment, the grooming members 24 in the second grooming section 22 include a plurality of flexible tines 26. In the example shown in FIG. 2, the flexible tines 26 are located adjacent a second end 28 of the base arrangement 12. The tines 26 can be in many different shapes or patterns, including, for example, a staggered pattern of 4-6 rows having 5-15 tines 26 per row. The flexible tines 26 can be used on sensitive areas for both debris removal and loose hair removal.

The tool 10 further includes a third section 30 of grooming members 32. The third section 30 of grooming members 32 is positioned between the first section 14 and second section 22. The third section 30 is constructed and arranged for use in normal, unsensitive areas of an animals coat. While many variations are possible, in the example shown, the third section 30 includes rigid, unflexible grooming members 32. For example, the rigid grooming members 32 can be in the form of rigid tines 34 constructed and arranged form grooming and hair removal.

As can be seen in FIG. 2, the third section 30 is in a middle area 36 of the base arrangement 12 located and extending between the first section 14 and second section 22.

While many different arrangements are possible, in the example shown, the grooming members 32 in the third section 30 are arranged in staggered rows of about 7-12 rows having 7-15 tines 34 per row.

Many variations are possible. In this example, the third section 30 of grooming members 32 projects from the base arrangement 12 longer than that first section 14 of grooming members 16 and the second section 22 of grooming members 24. This arrangement can be helpful in more convenient grooming of the animal in the unsensitive areas.

Figure 1:
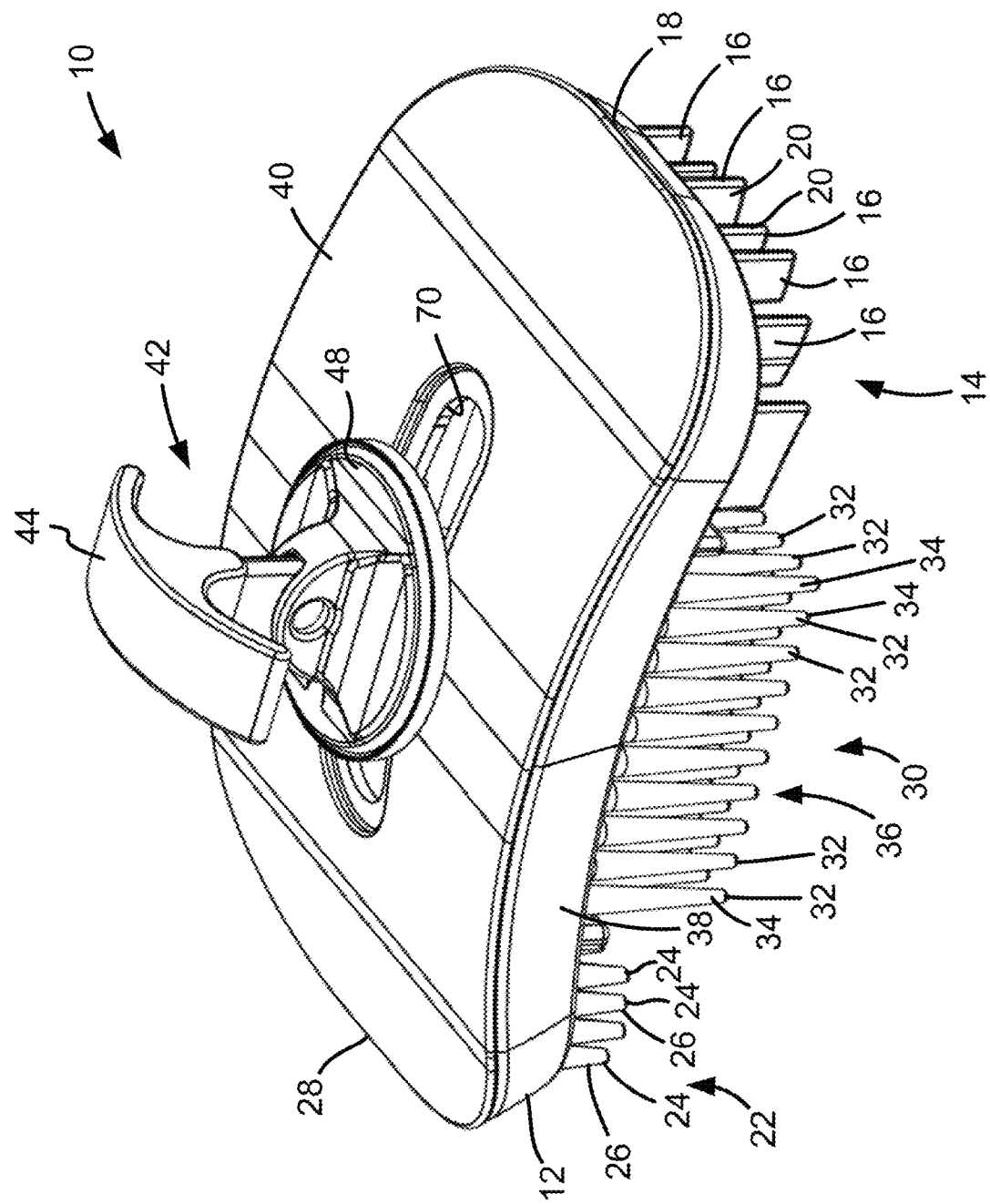
FIG. 1 is a perspective view of an embodiment of a grooming tool, constructed in accordance with principles of this disclosure.

From a review of FIG. 1, it can be seen how in preferred embodiments, the base arrangement 12 is curved between the first end 18 and the second end 28, such that there is a concave portion 38 and opposite convex portion 40. Each of the first section 14, second section 22, and third section 30 extend from the concave portion 38.

The grooming tool 10 further includes a grip assembly 42. The grip assembly 42 projects from the base arrangement 12 in a direction opposite of a direction that the first section 14, second section 22, and third section 30 of grooming members extend from the base arrangement 12. The group assembly 42 is sized and shaped such that a user can grasp the width of the base arrangement 12, with his hand, while portions of the grip assembly 42 extend or project over the outer part of the hand. That is, the grip assembly 42 can be help hold and secure the hand in place onto the base arrangement 12. As can be seen in FIG. 1, the grip assembly 42 extends from the convex portion 40 of the base of the base arrangement 12.

Many different arrangements for the grip assembly 42 are usable. In this example, the grip assembly 42 includes a grip handle 44 and a fastener arrangement 46. The grip handle 44 can be generally T-shaped, in which the top of the T can be curved with a pair of wings 45, 47 a direction toward the base arrangement 12 so that the users fingers are cupped within the wings 45, 47 of the T. In preferred embodiments, the wings 45, 47 are flexible to accommodate different finger sizes.

Figure 7:
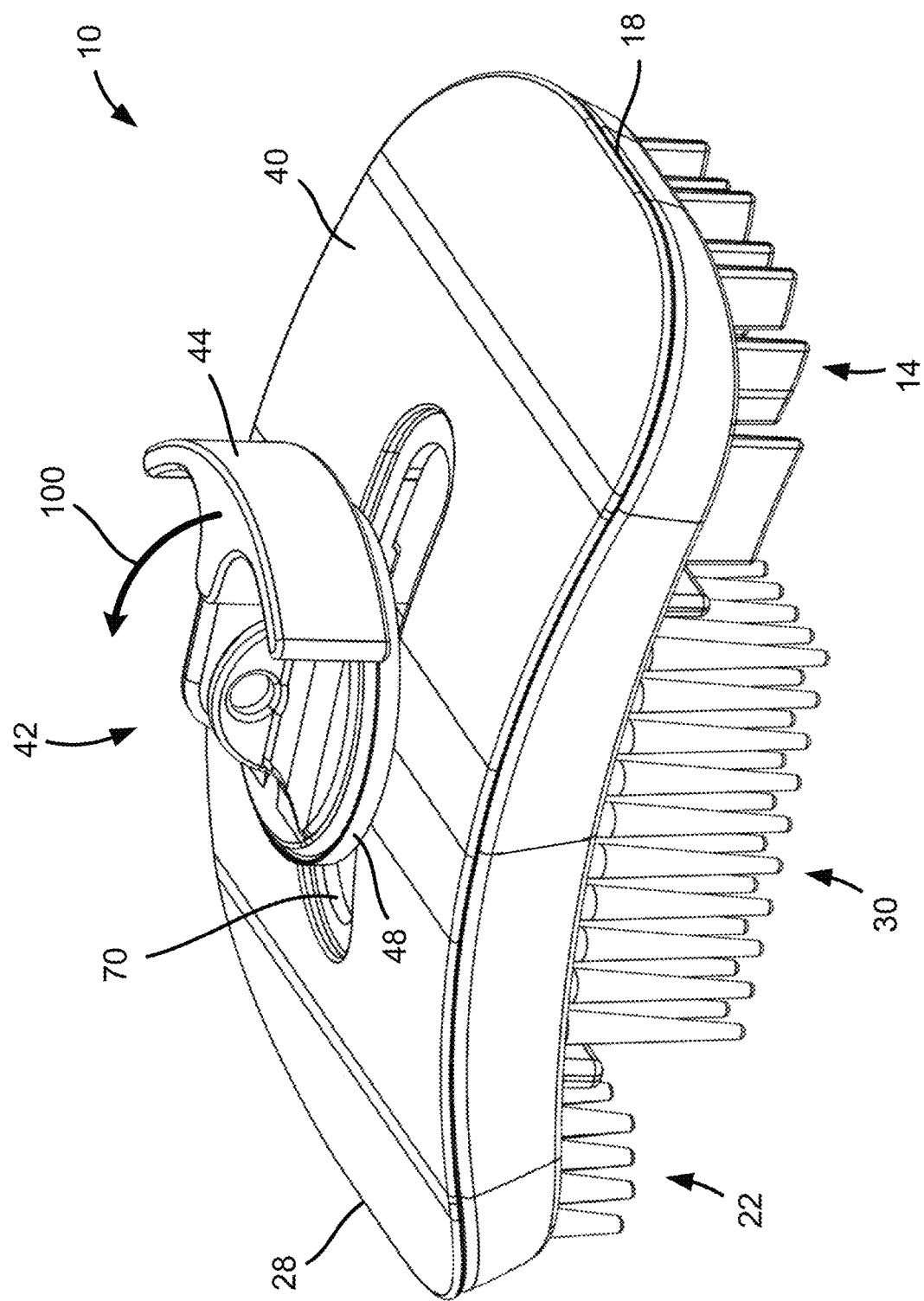
FIG. 7 is a perspective view of the grooming tool of FIG. 1, showing a grip handle positioned against a base arrangement of the tool.

The fastener arrangement 46 can be many variations, including variations that allow the grip handle 46 to pivot 180° along a motion shown at 100 in FIG. 7, from a position lying adjacent the base arrangement 12 (FIG. 7); to 90° away from the base arrangement 12 perpendicular to the base arrangement 12 (FIG. 1); to another 90° again lying adjacent the base arrangement 12.

In the embodiment shown, the fastener arrangement 46 includes a base 48 holding the grip handle 44. Underneath the base 48 is a latch top 50 with a center hole 52. A screw 54, spring 56, latch center 58, and latch base 60 can be connected together as shown in the cross-section of FIG. 6 to secure the grip handle 44 to the base arrangement 12 and allow the grip handle 44 to pivot. Many variations are possible.

Figure 8:
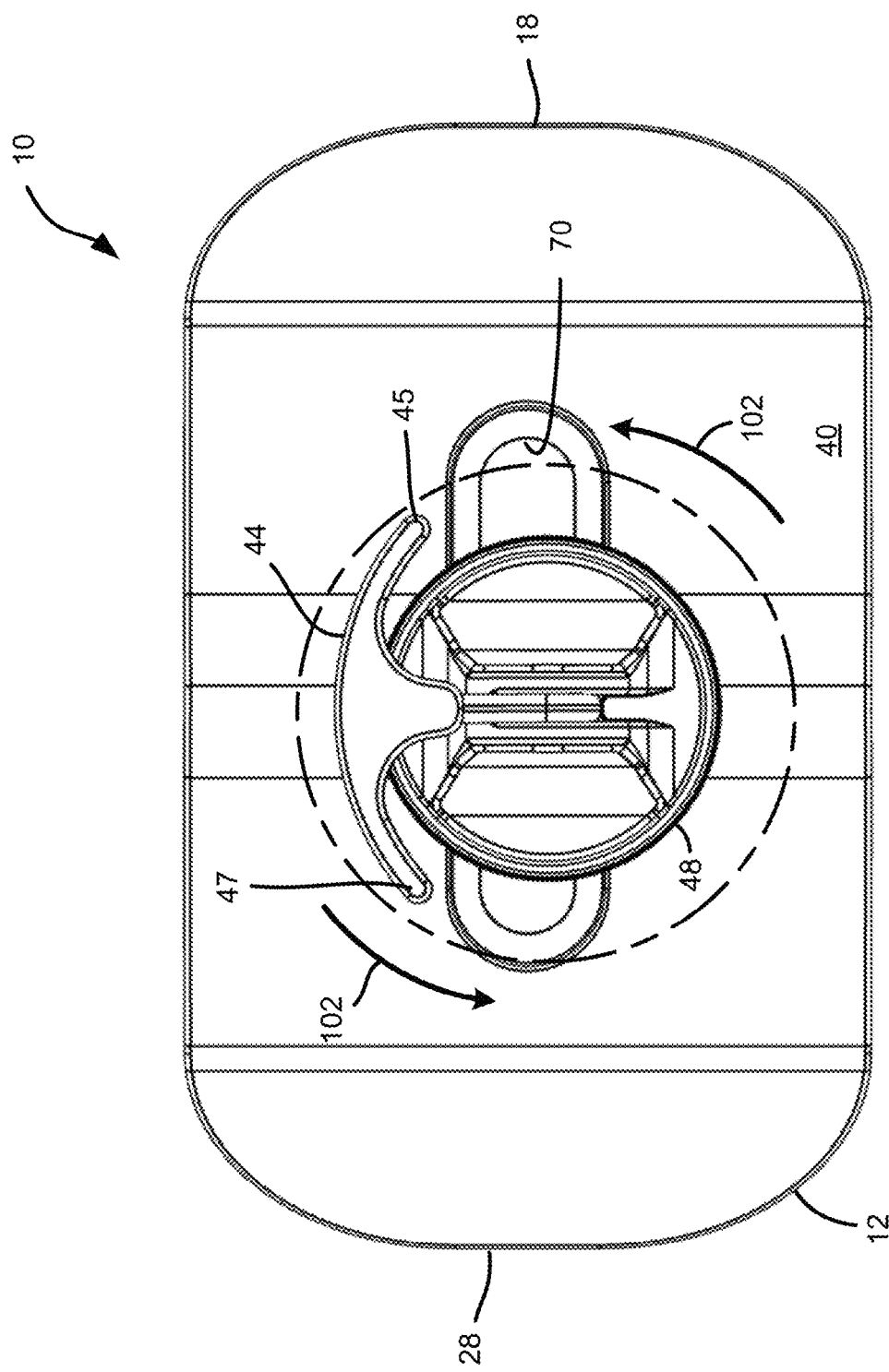
FIG. 8 is a top plan view of the grooming tool of FIG. 7.

In preferred embodiments, the grip handle 46 is swivelable or rotatable. In particular, the grip handle 46 can rotate a full 360 degrees in a plane perpendicular to a longitudinal axis of the grip handle 46. That is, the grip handle 46 is rotatable relative to the base arrangement 12. In FIG. 8, the grip handle 46 is shown pivoted against the base arrangement 12, and arrow 102 shows a direction that the handle 46 can be rotated. In this example, the arrow 102 shows rotation in a counter-clockwise direction, but it should be appreciated that the handle 46 can also be rotated in a clockwise direction. While the handle 46 is depicted pivoted against the base arrangement 12 in FIG. 8, it should be appreciated that the handle 46 can be in the upright position of FIG. 1 while being rotated.

Figure 3:
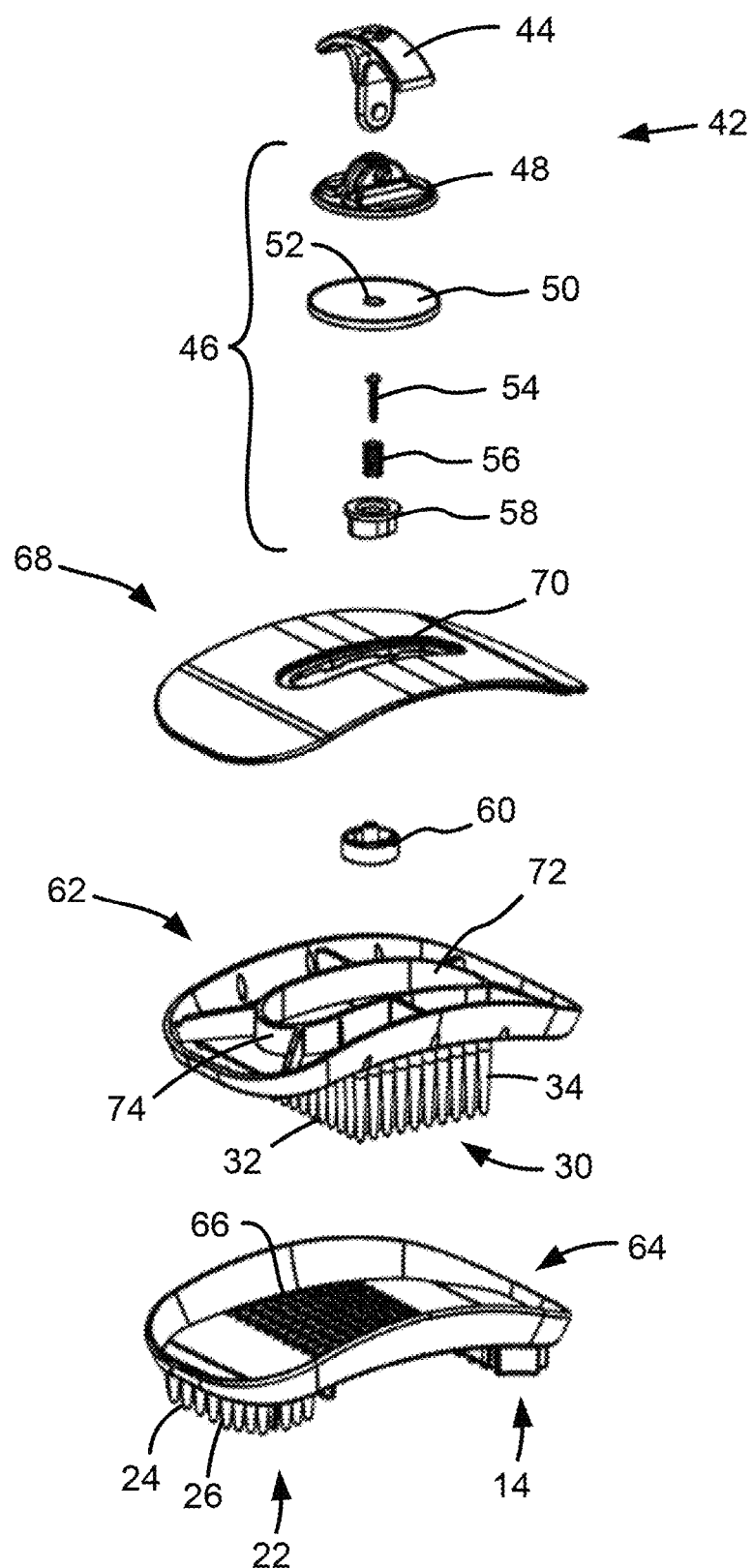
FIG. 3 is an exploded perspective view of the grooming tool of FIG. 1.
Figure 4:
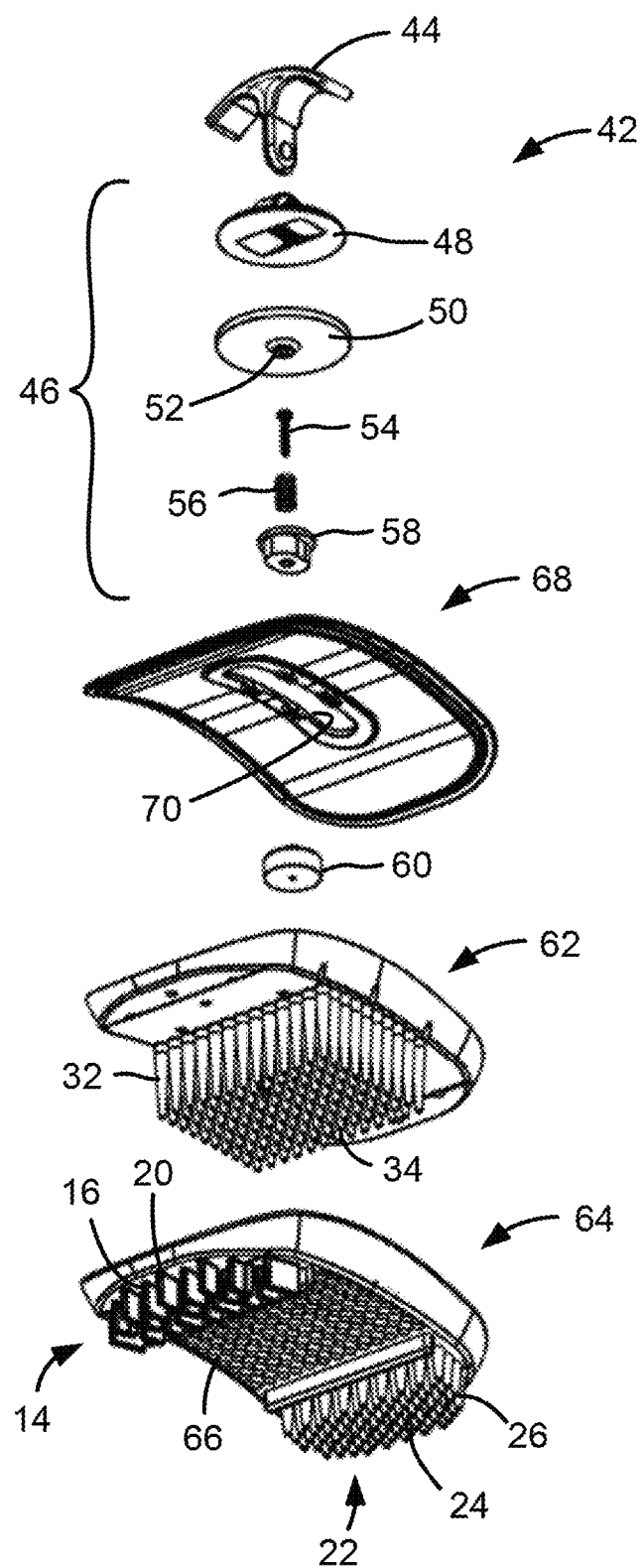
FIG. 4 is another exploded perspective view of the grooming tool of FIG. 1.
Figure 5:
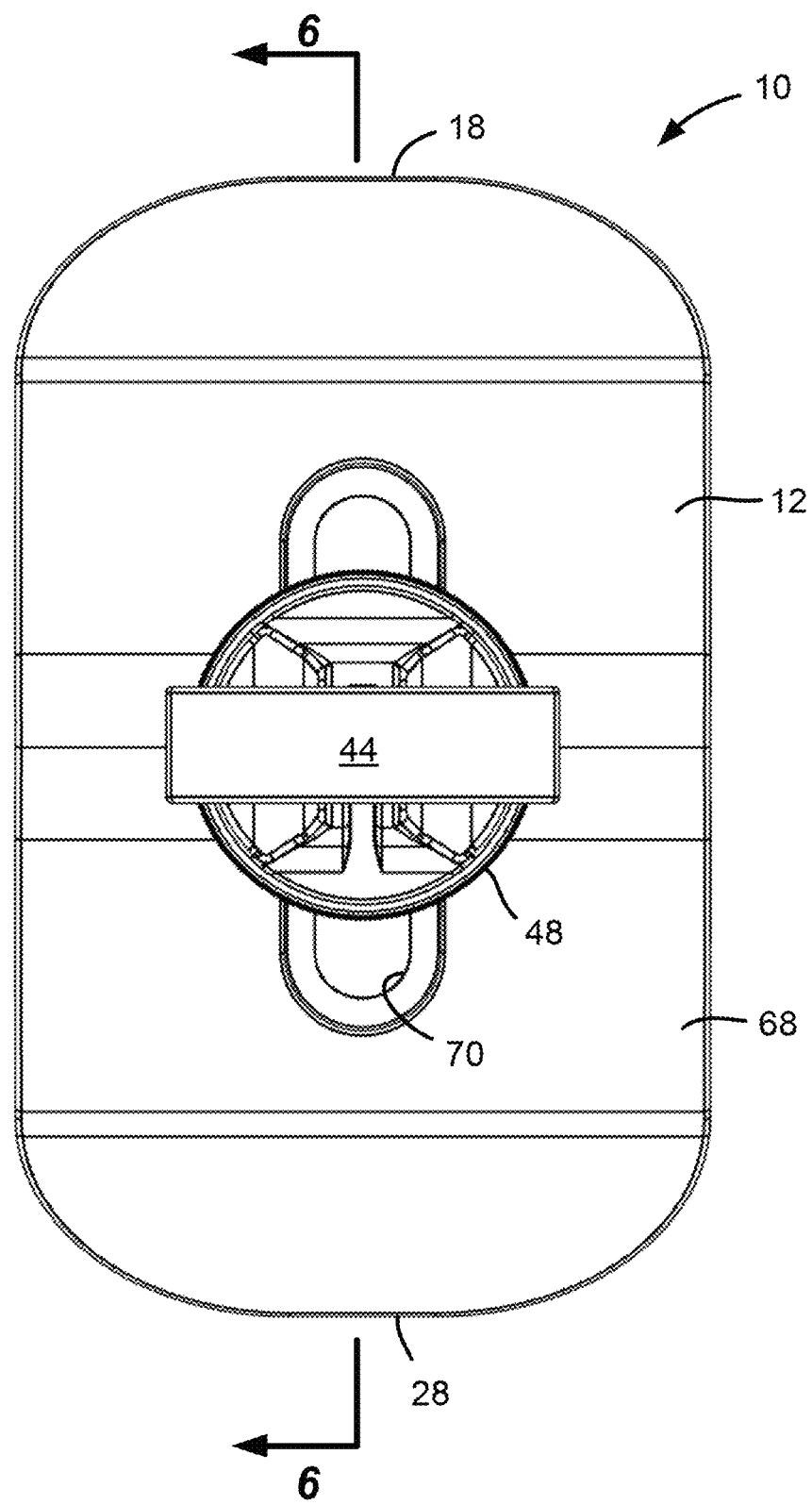
FIG. 5 is a top plan view of the grooming tool of FIG. 1.

In reference now to the exploded perspective views of FIGS. 3 and 4, an example embodiment for the components of the base arrangement 12 are shown. In this example, the base arrangement 12 includes a bottom piece 62 having the third section 30 of grooming members 32 integral therewith. Also visible in FIGS. 3 and 4, it can be seen that the base arrangement 12 has an overmold piece 64. The overmold piece 64 has the first section 14 and second section 22 with the grooming members 16 integral therewith. The overmold piece 64 further includes a segment 66 between the first section 14 and second section 22 of grooming members 16, 24 that allow penetration of the third section 30 of grooming members 32 in the bottom piece 64. The overmold piece 64 is secured to the bottom piece 62, including by molding it thereon.

Figure 6:
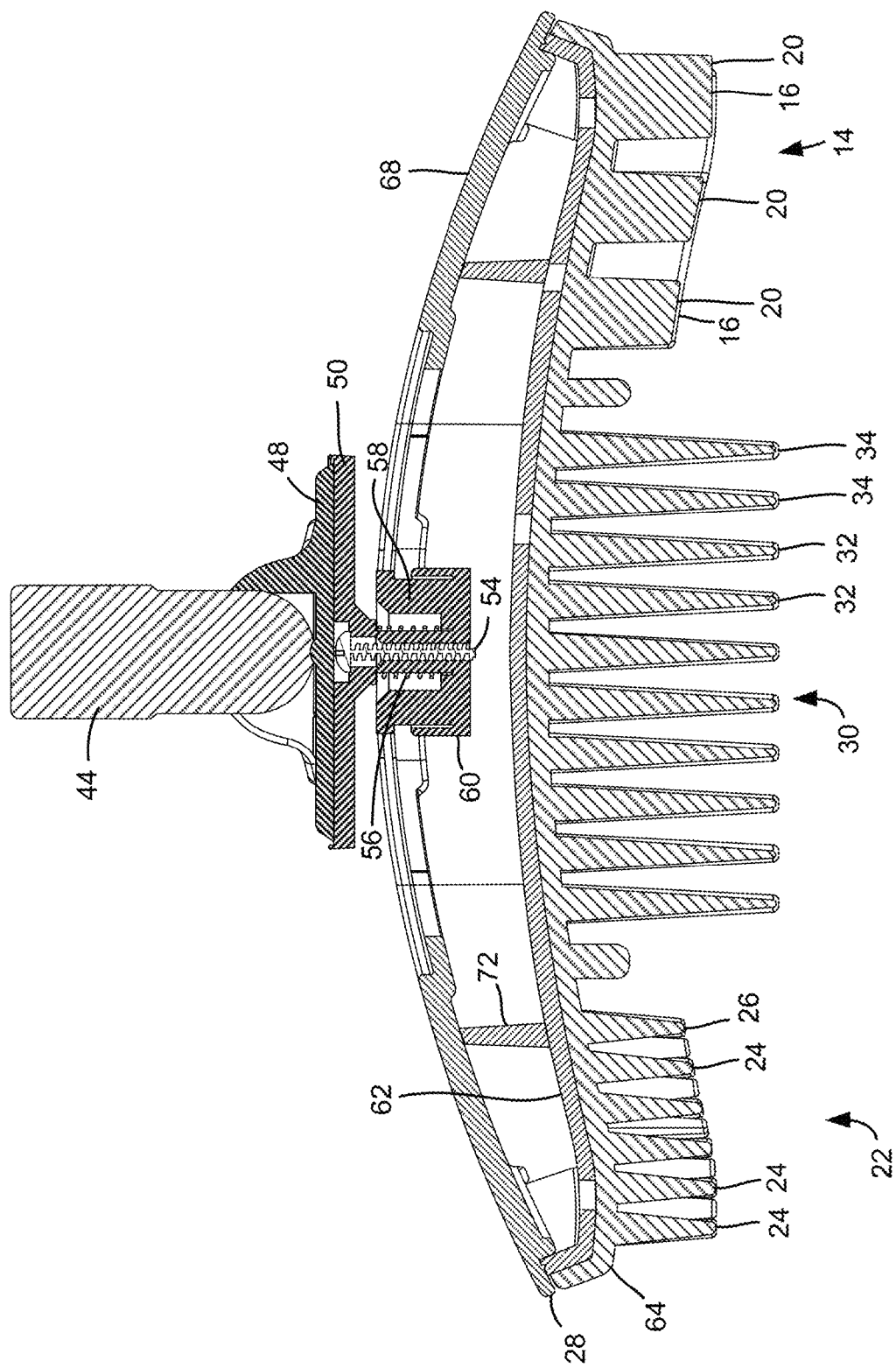
FIG. 6 is a cross-sectional view of the grooming tool of FIG. 1, the cross section being taken along the line 6-6 of FIG. 5.

The base arrangement 12 further includes a top piece 68 secured to the bottom piece 62, which can include, for example, ultrasonic welding. The top piece 68 includes an opening 70 to accommodate a portion of the grip assembly 42. For example, in this embodiment, the opening 70 is an elongated slot generally in the vicinity of the third section 30 of the base arrangement 12. As can be seen in FIG. 6, portions of the fastener arrangement 46 penetrate the opening 70.

Still in reference to FIGS. 3, 4, and 6, the bottom piece 62 includes a rib arrangement 72 on an opposite side of the bottom piece 62 from the grooming members 32 of the third section 30. The rib arrangement 72 includes a surrounding enclosure 74. The latch base 60 is held within the enclosure 74. The rib arrangement 72 help to dampen vibration or noise. Many variations are possible.

The grooming tool 10 can be used as part of a method of grooming an animal. The method includes grasping the base arrangement 12. The method can also include using flexible members 16 in the first section 14 secured to the base arrangement 12 to remove dirt from the animal. The method can also include using flexible members 24 in the second section 22 spaced from the first section 14 and secured to the base arrangement 12 to remove dirt and loose hair from the animal.

The method can further include using rigid grooming members 32 positioned between the first section 14 and second section 22 to groom and remove loose hair.

In many example methods, the step of grasping the base arrangement 12 will include grasping the grip assembly 42 projecting from the base arrangement 12. This can also include the step of pivoting or rotating the grip handle 44 to a position for comfortable use by the user, such as a position adjacent and against the base arrangement 12 to a position extending or projecting perpendicular from the base arrangement 12.

The method of grooming can include positioning the users hand to hold the base arrangement 12 while allowing the top of the T-shaped grip handle 44 to extend against the outside of the persons hand.

The method can further include using the base arrangement 12 in which the base arrangement 12 is curved, and the first section 14, second section 22, and third section 30 extend from a concave portion 38 of the base arrangement 12.

The method can further include using the tool 10, so that the third section 30 of grooming members 32 projects from the base arrangement 12 longer than the first section 14 of grooming member 16 and the second section 22 of grooming members 24 extend from the base arrangement 12.

The above represents example principles. Many embodiments can be made using these principles.

What is claimed is:

1. A grooming tool for sensitive areas of an animal; the grooming tool comprising:
   (a) a base arrangement sized for grasping by a human hand;
   (b) a first section of grooming members; the grooming members in the first section being flexible members secured to the base arrangement;

(c) a second section of grooming members spaced from the first section; the grooming members in the second section being flexible members and secured to the base arrangement;
(d) a third section of grooming members positioned between the first section and second section; the third section of grooming members being rigid members; and
(e) a grip assembly projecting from the base arrangement in a direction opposite of a (e) direction that the first section and second section of grooming members extend from the base arrangement;
wherein the base arrangement comprises:
  (i) a bottom piece having the third section of grooming members integral therewith;
  (ii) an overmold piece having the first section and second section of grooming members integral therewith; the overmold piece being secured to the bottom piece; and
  (iii) a top piece secured to the bottom piece; the top piece including an opening to accommodate a portion of the grip assembly.

2. The grooming tool of claim 1 wherein the grip assembly includes:
(a) a grip handle and a fastener arrangement; the grip handle being secured to the base arrangement by the fastener arrangement and being constructed and arranged to pivot relative to the base arrangement.

3. The grooming tool of claim 2 wherein the grip handle is t-shaped.

4. The grooming tool of claim 3 wherein the T-shape includes a pair of flexible wings to accommodate varying finger sizes.

5. The grooming tool of claim 2 wherein the grip handle is rotatable within a plane perpendicular to a longitudinal axis of the grip handle.

6. The grooming tool of claim 1 wherein the base arrangement is curved having a concave portion and convex portion; the first section, second section, and third section extending from the concave portion.

7. The grooming tool of claim 6 wherein:
(a) the first section is adjacent a first end of the base arrangement;
(b) the second section is adjacent a second end of the base arrangement; and
(c) the third section is in a middle area of the base arrangement.

8. The grooming tool of claim 1 wherein:
(a) the grooming members in the first section comprise a plurality of flexible blades; and
(b) the grooming members of the second section comprise a plurality of flexible tines.

9. The grooming tool of claim 1 wherein the grooming members in the third section comprise a plurality of rigid tines.

10. The grooming tool of claim 1 wherein the overmold piece includes a segment, between the first section and second section of grooming members, that allow penetration of the third section of grooming members in the bottom piece.

11. The grooming tool of claim 1 wherein the bottom piece includes a container, on an opposite side of the third section, holding at least a portion of the grip assembly.

12. The grooming tool of claim 1 wherein the third section of grooming members projects from the base arrangement longer than the first section of grooming members and second section of grooming members.

13. A grooming tool comprising:
(a) a base arrangement sized for grasping by a human hand; the base arrangement having an upper face and a lower face;
(b) grooming members projecting from the lower face; and
(c) a grip assembly projecting from the upper face; the grip assembly including a T-shaped grip handle, wherein the T-shape includes a pair of flexible wings to accommodate varying finger sizes, wherein the grip handle is both:
  (i) pivotable relative to the base arrangement; and
  (ii) rotatable relative to the base arrangement.

14. The grooming tool of claim 13 wherein the grooming members include:
(a) a first section of grooming members; the grooming members in the first section being flexible members secured to the base arrangement;
(b) a second section of grooming members spaced from the first section; the grooming members in the second section being flexible members and secured to the base arrangement; and
(c) a third section of grooming members positioned between the first section and second section; the third section of grooming members being rigid members.

15. The grooming tool of claim 14 wherein:
(a) the grooming members in the first section comprise a plurality of flexible blades;
(b) the grooming members of the second section comprise a plurality of flexible tines; and
(c) the grooming members in the third section comprise a plurality of rigid tines.

16. The grooming tool of claim 13 wherein the grip assembly includes a fastener arrangement securing the grip handle to the base arrangement.

17. A grooming tool for sensitive areas of an animal; the grooming tool comprising:
(a) a base arrangement sized for grasping by a human hand;
(b) a first section of grooming members; the grooming members in the first section being flexible members secured to the base arrangement;
(c) a second section of grooming members spaced from the first section; the grooming members in the second section being flexible members and secured to the base arrangement;
(d) a third section of grooming members positioned between the first section and second section; the third section of grooming members being rigid members; and
(e) a grip assembly projecting from the base arrangement in a direction opposite of a direction that the first section and second section of grooming members extend from the base arrangement, wherein the grip assembly includes:
  (i) a T-shaped grip handle and a fastener arrangement; the grip handle being secured to the base arrangement by the fastener arrangement and being constructed and arranged to pivot relative to the base arrangement; the T-shape including a pair of flexible wings to accommodate varying finger sizes.

18. The grooming tool of claim 17 wherein:
(a) the grooming members in the first section comprise a plurality of flexible blades; and
(b) the grooming members of the second section comprise a plurality of flexible tines.

19. The grooming tool of claim 18 wherein:
(a) the first section is adjacent a first end of the base arrangement;
(b) the second section is adjacent a second end of the base arrangement; and
(c) the third section is in a middle area of the base arrangement.

20. The grooming tool of claim 17 wherein the grooming members in the third section comprise a plurality of rigid tines.

21. The grooming tool of claim 17 wherein the grip handle is rotatable within a plane perpendicular to a longitudinal axis of the grip handle.

22. The grooming tool of claim 17 wherein the base arrangement is curved having a concave portion and convex portion; the first section, second section, and third section extending from the concave portion.

23. The grooming tool of claim 17 wherein the third section of grooming members projects from the base arrangement longer than the first section of grooming members and second section of grooming members.

* * * * *